United States Patent [19]

Hinterwaldner et al.

[11] Patent Number: 5,228,913

[45] Date of Patent: Jul. 20, 1993

[54] COMPOSITIONS WHICH SET IN THE PRESENCE OF WATER, THEIR USE AND METHOD FOR PRODUCING MOLDED ARTICLES FROM SUCH COMPOSITIONS

[75] Inventors: Rudolf Hinterwaldner, Munich; Peter Mauthe, Türkheim; Ulrich Hense, Landsberg/Lech, all of Fed. Rep. of Germany

[73] Assignee: Hilti Aktiengesellschaft, Furstentum Liechtenstein

[21] Appl. No.: 675,677

[22] Filed: Mar. 27, 1991

[30] Foreign Application Priority Data

Mar. 28, 1990 [DE] Fed. Rep. of Germany ....... 4009998

[51] Int. Cl.$^5$ ............................................. C04B 12/04
[52] U.S. Cl. ................................... 106/603; 106/692; 106/819
[58] Field of Search .............. 106/600, 601, 602, 603, 106/606, 638, 639, 692, 705, 713, 714, 819, 38.2, 38.22, 38.3, 38.38

[56] References Cited

U.S. PATENT DOCUMENTS

| | | | |
|---|---|---|---|
| 4,050,948 | 9/1977 | Gandy et al. | 106/606 |
| 4,082,561 | 4/1978 | Nakagawa et al. | 106/819 |
| 4,504,315 | 3/1985 | Allemann et al. | 106/819 |
| 4,533,393 | 8/1985 | Neuschaeffer et al. | 106/600 |

*Primary Examiner*—Mark L. Bell
*Assistant Examiner*—Paul Marcantoni
*Attorney, Agent, or Firm*—Anderson.Kill Olick & Oshinsky

[57] ABSTRACT

A composition and method are disclosed whereby the formation of geopolymers from curable, inorganic, stone-forming $SiO_2$ and $Al_2O_3$ containing compositions is accelerated by materials which exhibit exothermic behavior in the presence of water. Such polymerizable compositions are suitable as mortar compositions for fastening anchor rods.

14 Claims, No Drawings

COMPOSITIONS WHICH SET IN THE PRESENCE OF WATER, THEIR USE AND METHOD FOR PRODUCING MOLDED ARTICLES FROM SUCH COMPOSITIONS

BACKGROUND OF THE INVENTION

This invention relates to a molding composition based on inorganic components which sets in the presence of water. More particularly, this invention concerns a composition comprising finely divided $SiO_2$ or mixtures of finely divided $SiO_2$ and $Al_2O_3$, at least partially water soluble alkali silicate, alkaline earth silicate and/or ammonium silicate and/or their precursors from the corresponding oxides or hydroxides and amorphous, finely divided silicic acid. The invention further relates to a method for curing the molding compositions and the use of the molding composition for a particular purpose.

Curable aqueous molding compositions of the aforementioned type are known from German Offenlegungsschriften 32 46 602 A1, 32 46 604 A1 and 32 46 619 A1. For the production of molded articles, these compositions must be brought into molds and heated therein to at least 50° C. and even up to 200° C. After removal from the mold, further post-curing at temperatures of 80° to 200° C. may be required. The molded articles obtained have bending strengths of 15 to 30 MPa, compression strengths of 25 to 90 MPa, good vibration absorbing properties, relatively low shrinkage values and good dimensional stability under heat.

However, the molding compositions have the serious disadvantage that they require an elevated temperature of 50° to 200° C. and preferably of 60° to 90° C. for setting or polycondensing. In some cases, such an elevated temperature is required to attain at least a sufficient green strength for removal from the mold, after which renewed heating is required for post-curing.

SUMMARY OF THE INVENTION

An object of the invention is to provide a molding composition which is free of the aforementioned disadvantages.

A particular object of the invention is to provide a molding composition which does not require external heat and cures within a short time even without such heat.

A further object of the invention is to provide a method for producing molded objects using a molding composition which is free of the disadvantages discussed above and which does not require external heat and cures within a short time even without such heat.

Another object of the invention is the provision of mortar compositions particularly useful for fastening dowels and anchor rods.

These and other objects are attained by the invention disclosed below.

It has been discovered that the formation of geopolymers from curable, inorganic stone-forming $SiO_2$ and $Al_2O_3$ containing compositions is accelerated by material which exhibits exothermic behavior in the presence of water. Based on this discovery, molding compositions of the invention, which cure and set in the presence of water, are comprised of a) finely divided $SiO_2$ and/or a mixture containing finely divided $SiO_2$ and $Al_2O_3$,
b) at least partially water soluble alkali metal silicate, alkaline earth metal silicate and/or ammonium silicate, and/or their percursors from the corresponding oxides or hydroxides and amorphous silicic acids and
c) inorganic and/or metallic and/or organometallic compounds, which become highly exothermic on contact with water and accelerate the setting of the molding composition.

Molded objects are prepared, according to the invention, by forming a paste with a deformable consistency either by combining components a), b) and c) with water, or by combining components a) and b) with water and then adding component c) thereto, placing the paste in a mold and allowing the paste to cure.

DESCRIPTION OF THE INVENTION

In the molding composition of the invention, component a) essentially is the component that controls the formation of the backbone polymer during polycondensation, while component b) essentially acts as curing agent and is incorporated at least partially into the backbone polymer. Component c) primarily has a reaction accelerating effect. However, the incorporation of at least part of component c) in the backbone polymer is by no means excluded.

If the three components are present as a dry mixture, the curing reaction is generally initiated by the addition of water, although it is also possible that the mixture of a) and b) contains water and the curing reaction then takes place due to the addition of the accelerator c) and optionally, at the same time, the addition of water.

$SiO_2$ which is provided as component a) is present preferably in an amorphous form, particularly one which is anhydrous. This form is preferred too, for the finely divided mixture of $SiO_2$ and $Al_2O_3$ can be present also, in partially crystalline form. The $SiO_2$ can originate also from amorphous, water containing silicic acid.

The proportions of $SiO_2$ and $Al_2O_3$ in the mixture preferably fall within the range of 5% to 80% by weight of $SiO_2$ and 95% to 20% by weight of $Al_2O_3$. The oxides of component a) can contain impurities, such as Fe, Na, K, etc., in the form of their oxides, silicates or aluminates, as further components. The impurities are generally present in amounts totalling less than 15% or 10% by weight, based on the total mixture of the stone-forming component a). Dusts from high temperature smelting processes, filter dusts, electrostatic filter ash from high temperature power plants and calcined, powdered bauxites have been found to be particularly suitable.

Alkali metal silicates, alkaline earth metal silicates and/or ammonium silicates are suitable as the curing agent for the backbone binder a). They can be used alone or in admixtures and generally have an excess of free alkali metal, alkaline earth metal and/or ammonium. The molar ratios of silicon dioxide to alkali metal, alkaline earth metal or ammonium generally are 0.5 to 12.5:1. For alkali metal and alkaline earth metal the molar ratios are particularly 1.0 to 5.0:1 and preferably 1.5 to 4:1. According to the invention, potassium and/or ammonium water glass are particularly preferred, because in conjunction with the additives described below, they not only accelerate the polycondensation during the setting process, but also provide final physical properties which are better and more homogeneous. Potassium and/or ammonium water glass means water glass in which the sodium has been replaced completely, or to a major extent, by potassium and/or ammonium. Aside from barium silicates and strontium silicates, the calcium silicates are particularly preferred. The pure calcium silicates are calcium metasilicate ($CaSiO_3$), and calcium orthosilicate ($Ca_2SiO_4$). However, other calcium silicates, such as $Ca_3(SiO_5)$, $Ca_3(Si_2O_7)$ and $Ca_3(Si_3O_9)$ are also suitable. From the large group of minerals, lime feldspar, which contains calcium silicates as the main constituent, is suitable as a hardener. From this group, the mineral wollastonite is particularly suitable.

Aside from the strictly inorganic ammonium silicates, the quaternary ammonium compounds are suitable ammonium silicates and function as hardener, setting accelerator and rheology modifier. In the preferred quaternary ammonium compounds, the hydrogen atoms on the nitrogen of the ammonium ion are partially or completely substituted by alkyl or hydroxyalkyl groups with 1 to 5 carbon atoms. As a result of the good solubility, the molar ratio of $SiO_2$ to ammonium in these composition is 0.5 to 12.5:1. Suitable quaternary ammonium silicates are, for example, tetramethylammonium silicate and methyltriethanolammonium silicate. The alkali metal silicates, alkaline earth metal silicates and ammonium silicates can also be present in the form of aqueous preparations.

Materials which form silicates, namely the corresponding oxides or hydroxides of the alkali metals, alkaline earth metals or ammonium and amorphous, disperse, powdery, water containing silicic acid, may also be present in compositions of the invention instead of the silicates.

Stone forming components a) and b) and mixtures, which are particularly preferred for the present molding compositions, are described in German Offenlegungsschriften 32 46 602 A1, 32 46 604 A1 and 32 46 619 A1 and European patent 0 148 280 B1, which are referred to explicitly and incorporated herein.

Although both reaction components, the backbone binder a) and the curing agent b), are hygroscopic, one-component and two-component molding composition systems can be produced with them. When a water impermeable and water vapor impermeable packing material is used, it becomes possible to produce and package a ready-for-use mixture of backbone binder and curing agent, which has a shelf life of several months. At the site of use, a paste is prepared from this mixture with the appropriate amount of water.

This polycondensing molding composition can also be prepared and packaged as a two-component system. In this case, the curing agent can be dissolved previously in the appropriate amount of water and then packaged in a container that is resistant to the effects of water and alkali.

Since the water in the inventive, polycondensing molding composition system has only vehicle and wetting functions, it can be used additionally for the activation of the inventive additives. This can be of particular advantage when at least one hydraulically setting material is present as an additive.

The accelerator component c), which is used according to the present invention, preferably is a member of a class of inorganic materials which includes metallic materials, organometallic compounds and/or the metal hydrides, which on contact with water undergo a strongly exothermic reaction, which accelerates the setting and curing reactions. Those accelerators which produce heat at the rate of at least 500 joule/g are particularly suitable.

Compounds suitable as component c) preferably come from the following groups:
group 2 of the periodic system, such as anhydrous alkaline earth metal oxides and magnesium oxides. Among other oxides, these include calcium, barium and strontium oxides;
clinker phases from the production of cements; among others, "Alite" ($C_3S$) and tricalcium aluminate ($C_3A$) are particularly suitable (compare cement literature: C=calcium oxide, S=silicon dioxide and A=aluminum oxide);
ammonium silicates;
anhydrites;
metal carbides of the general formula $M^I_2C_2$ or $M^{II}C_2$, such as calcium carbide ($CaC_2$), iron carbide ($Fe_3C$);
metal alkyls of the general formula $MR_n$, such as triisobutyl aluminum, wherein M is a metal cation and n is equal to the valency of the metal cation;
metal amides, metal imides and metal nitrides of the general formula $MNH_2$, $M_2NH$ and $M_3N$, such as sodium or lithium amide, wherein M is a monovalent metal cation;
metal azides of the general formula $XN_3$, wherein X represents a metal cation, such as sodium azide;
organic azides of the general formula $RN_3$, wherein R is an alkyl, aryl or acyl;
metal carbonyls from the group of mononuclear or multinuclear coordination compounds, in which carbon dioxide molecules are coordinatively linked to metal atoms, such as disodium tetracarbonyl ferrate;
metallic materials, such as reactive metal and/or alloy powders, such as powdery iron silicides (ferrosilicon), powdery silicon aluminum, etc;
metal hydrides, including stoichiometric metal hydrides, such as the hydrides of the alkali metal and alkaline earth metals, the. high-polymer hydrides, such as those of aluminum, beryllium and magnesium, and the so-called complex hydrides, such as alanates and boranates and
ammonium nitrate and nitrite.

The suitability of a compound for the purposes of the present invention is decided on the basis of whether the compound undergoes an exothermic reaction on contact with water; the heat evolved accelerates the stone forming reaction and amounts to at least 500 joule/g. The quaternary ammonium silicates can act at the same time as curing agents and accelerators.

The heats of hydration of the following examples of suitable compounds illustrate the evolution of heat:

| | | | |
|---|---|---|---|
| $C_3S$ | 500 J/g | CaO | 1160 J/g |
| $C_3A$ | 1350 J/g | Iron silicide | 2850 J/g |
| MgO | 850 J/g | Ammonium nitrate | 1571 J/g |

In polycondensing molding compositions, the water essentially has vehicle and wetting functions. It can, however, also be used for the activation of, for example, a hydraulic component c). Conventional, commercial, hydraulically setting binders, such as portland cements, iron portland cements, trass cements, blast furnace cements, oil shale cements, aluminous cements and mixtures are suitable for accelerating the reaction. However, alkali metal salts and alkaline earth metal salts of carbonic acid, such as lithium hydrogen carbonate, lithium carbonate and barium carbonate, are also suitable. The portland cements, blast furnace cements, trass cements and oil shale cements have a relatively high calcium oxide content and a relatively low aluminum oxide content. On the other hand, the proportions by weight in aluminous cements are approximately the same, as shown in Table 1. Both types of cement evolve heat of hydration on contact with water, but the heat evolved on contact with water is different. The same is true for the alkali metal carbonates and the alkaline earth metal carbonates.

Even though the heat of hydration of every additive upon contact with water represents an essential inventive attribute, a series of synergistic effects can additionally be observed during the setting. Surprisingly, it was found that accelerated polycondensation, hydration and setting is obtained with the backbone binders, which set by way of polycondensation after the addition of one or several of the accelerators present in accordance with the invention, upon contact with water or pasting with water, even if the setting temperature in a 100 g batch does not exceed +50° C. On the other hand, a molding composition with the backbone binders and curing agents, but without an accelerator, shows only partial polycondensation and setting behavior and is still soft after days, if the mass has not previously dried out, and does not reach optimum final properties and strengths.

Accordingly, the polycondensation and setting rates can be varied within wide limits, even in small batches, as a function of the composition of the oxide mixture with and without amorphous silicic acids, by suitably selecting and adding one or several accelerators according to the invention. In this connection, a differentiation is made in practice also, as in the case of compositions based on organic reaction resins, between pot life (flowability), green strength and final strength. Therefore, in accordance with the invention, it is possible to prepare filled and unfilled molding compositions which have pot lives between 5 seconds and 30 minutes and yield green strengths equal to 50% of the final strength, after a period varying from 60 seconds to 30 minutes, and final strengths equal to 90% after 30 minutes at room temperature (20° to 23° C.) even in batches of 100 g. The measured temperature change for batches of this size, that is, for the whole molding composition, is +35° C.

Admittedly, it is known from the German Offenlegungsschrift 37 44 210 A1 that the curing of compositions of the type under consideration can be accelerated by the addition of peroxides as foaming agents that split off oxygen for the production of foamed objects and the addition of a reducing agent and/or an oxidizing agent and/or a finely divided material of high surface area to accelerate the decomposition. Aside from the fact that this reference involves of a narrowly limited, special case, which is not applicable for the production of molded objects that are not foamed or for the production of all other foamed, molded objects, a completely different action principle is involved for the utilization of the exothermic energy of the peroxide decomposition.

If compounds used as component c) form gases or expand on contact with water, then it is possible to prepare interesting and stable foam structures with the help of these compounds. Calcium carbide is an example of such a compound. Aside from forming a gas upon contact with water, it is a reaction accelerator, which is subsequently integrated into the backbone binder matrix when the binder matrix has set.

Aside from these by-product gases, which are formed from component c) and which act as blowing and expanding agents, foamed objects can also be prepared from the inventive molding compositions by the use of conventional blowing and expanding agents. These include, for example, those described in the German Offenlegungsschrift 32 46 619 A1. However, chemical blowing agents, such as azodicarbonamide, hydrazine derivatives, semicarbazides, tetrazoles and benzoxazines can also be used.

Foams can also be produced from the inventive setting molding compositions even during the pot life phase by the introduction of gases, such as air, nitrogen, carbon dioxide. This technique is of interest particularly when a molded object of small volume, especially one with a volume not exceeding 100 cc is to be produced, as is the case particularly with dowel compositions in fastening technology. This stream of gas can additionally be heated, by which means the polycondensation and the setting are accelerated and/or the amounts of inventive additives can be reduced.

Moreover, the inventive molding compositions may contain fillers, pigments, dyes, thixotropizing agents and also other additives to regulate the rheological properties, the wetting and the like. However, it is also possible for the inventive molding compositions to contain materials to improve the adhesion, such as physically and/or chemically setting synthetic resin dispersions, including those based on polyvinyl acetate, acrylates, methacrylates, polyesters and their copolymers.

From the class of fillers, particularly those based on silicon dioxide, such as finely ground quartz, quartz sands, aluminum oxide, such as powdered corundum and corundum granulates, are suitable. Since these fillers may be partially amorphous, surprisingly, it has been discovered that they contribute to reinforcing the hardened molding composition matrix. Naturally, fiber materials from organic polymers, such as aramide, polyethylene and polypropylene, can also be used to reinforce the matrix.

A further object of the invention is the provision of methods for producing molded objects using the inventive molding compositions. It has been found that the preferred procedure is to prepare a paste with a deformable consistency from an intimate mixture of components a), b) and c) and water, or to process, to begin with, components a) and b) with water and then to add component c) to form a flowable, pasty consistency and then to allow the composition to cure, optionally after it is molded. The water or an aqueous, alkaline medium can be used in an amount of 15 to 70% by weight and preferably of 20 to 50% by weight, based on the total dry composition.

The inventive molding compositions have three broad areas of application: building construction in particular, underground engineering and the mining industry, and the artisan and handicraft areas. The water containing, flowable and/or thixotropic pastes from these geopolymers prepared with hardeners can be processed like normal cement mortars and concrete polymers and can also take over their functions and tasks in many applications. The properties of the setting molding compositions of the invention can be varied within relatively wide limits. For example, the formulations can be adjusted to set rapidly, moderately or slowly. Accordingly, on this basis, dowel compositions can be made available for the fastening sector and mortar compositions can be made available for the whole of the construction and mining sector. Yet another object of the invention, accordingly, is the use of the inventive compositions as mortar compositions for fastening dowels and anchor rods.

Since foamed objects can be produced from the molding compositions of the invention, these compositions can also be used economically to fill cavities. Foams so produced are distinguished by a high compression stability at a low specific gravity and serve as sound and heat insulation.

The molding compositions of the invention can be processed in well known, conventional commercial 2-component processing equipment, such as mixing guns, mixing and metering equipment for concrete polymers and also in so called 2-chamber systems. However, it is also possible simply to mix the two components together in one pot.

A need is satisfied by the compositions of the invention which has existed for a long time, particularly in building construction, underground engineering and the mining industry, as well as in artisan and homeworker areas, for inorganic reactive molding compositions and especially for dowel compositions which can be used at ambient temperatures, are easily handled and have advantageous setting characteristics, i.e. the setting process does not proceed in an uncontrollable manner or, at times, only incompletely and is concluded within justifiable times.

Based on the geopolymers of the invention, a setting molding composition is now available to the expert and the do-it-yourselfer, which is comprised of an inorganic backbone binder and which is distinguished, among other things, by the following advantages and advances:
convenient processability;
low environmental and ecological impact;
mixing ratio of the 2-component systems not critical;
adjustable pot life and setting times;
can be processed even at temperatures below 0° C.;
sets under water;
cannot burn and
exceptionally economical in comparison with concrete polymers based on organic polymers.

Some of the properties of the hardened molding compositions are:
early green and final strengths, for example, after 30 minutes;
incombustible, no development of fumes;
resistant to solvents, weak and strong alkalies, as well as sulfuric acid;
surface hardness adjustable at 3 to 8 mohs;
specific gravity of compact masses: 1,600–3,500 kg/m$^3$;
specific gravity of foamed masses: 200–1,000 kg/m$^3$;
bending strength: 10–40 MPa adjustable;
compression strength: 20–100 MPa adjustable;
modulus of elasticity: 10,000–50,000 MPa;
linear thermal expansion: 1 to $8\times10^{-6}$/° K.;
high absorption of oscillations;
good dimensional stability under heat;
low creep in comparison to concrete polymers;
high composite strengths when used as a composite mortar and/or dowelling composition and high aging stability.

The invention is also explained by means of the examples below, which further illustrate the best mode currently contemplated for carrying out the invention. However, the examples must not be construed as limiting the invention in any manner.

EXAMPLES

The following components were used to prepare the inventive molding compositions of Examples 1 to 16:

| Oxide Mixture (solids) | |
|---|---|
| No. 1: | 25% by weight SiO$_2$ |
| | 75% by weight Al$_2$O$_3$ |
| No. 2: | 30% by weight SiO$_2$ |
| | 70% by weight Al$_2$O$_3$ |
| No. 3: | 40% by weight SiO$_2$ |
| | 60% by weight Al$_2$O$_3$ |
| Hardener Solution | |
| No. 1: | 20.00% by weight SiO$_2$ |
| | 20.88% by weight K$_2$O |
| | 59.12% by weight water |
| No. 2: | 21.28% by weight SiO$_2$ |
| | 21.60% by weight K$_2$O |
| | 57.12% by weight water |
| No. 3: | 19.75% by weight K$_2$O |
| | 26.08% by weight SiO$_2$ |
| | 1.15% by weight NH$_4$OH |
| | 53.02% by weight water |
| Accelerator: See Table 2 | |

A concrete of quality class B 15 and an M12 anchor rod were selected to test the compositions.

EXAMPLES 1 TO 16

A homogeneous dry mixture was prepared by mixing the dry components consisting of oxide mixture, fillers and accelerators. Subsequently, the hardener solution was added to a beaker and the dry mixture was added to it in portions and stirred with a high-speed stirrer. Rapid stirring is required to break the resulting thixotropy. The weight of the batches was 200 g. The respective, homogeneous mortar paste was poured into boreholes (with a diameter of 14 mm and a depth of 12 cm), filling them ⅝ of the way. Subsequently, M12 anchor rods were pressed into the respective mortar bed in the borehole.

The compositions of the molding compositions and the characteristic data determined are summarized in Table 2.

COMPARISON EXAMPLE 1

Oxide mixture No. 1 (100 g) and 150 g of quartz sand (0.1–0.25 mm) were mixed homogeneously and subsequently stirred with a high-speed stirrer into 100 g of hardener solution No. 1. Three boreholes were filled with this mortar and the characteristic technical data were determined. The molding composition had a pot life of 350 minutes and the green strength was attained after 4 days. There was not yet any bond strength after 2 weeks.

TABLE 1

| | Chemical Composition of Cements (Reference Values in %) | | | | | | | | |
|---|---|---|---|---|---|---|---|---|---|
| | | Portland Cement | | | | | | | |
| Oxides | Normal | early high strength | with high sulfate resistance | white | Iron Portland Cement | Blast Furnace Cement | Trass Cement | Oil Shale Cement | Aluminous Cement |
| CaO | 61–69 | 66 | 64 | 67 | 50–66 | 44–61 | 47–60 | 54–61 | 37–39 |

TABLE 1-continued

Chemical Composition of Cements (Reference Values in %)

| Oxides | Normal | Portland Cement early high strength | Portland Cement with high sulfate resistance | white | Iron Portland Cement | Blast Furnace Cement | Trass Cement | Oil Shale Cement | Aluminous Cement |
| --- | --- | --- | --- | --- | --- | --- | --- | --- | --- |
| $SiO_2$ | 18–24 | 20 | 21 | 23 | 19–28 | 21–30 | 20–28 | 18–23 | 3–5 |
| $Al_2O_3$ | 4–8 | 5 | 4 | 4 | 4–12 | 6–15 | 5–10 | 6–8 | 38–40 |
| $Fe_2O_3$ | 1–8 | 3 | 7 | <1 | 1–4 | 1–3 | 2–4 | 3–4 | 15–18 |
| MgO | <5 | <2 | <2 | <2 | <6 | <7 | <3 | <2 | <15 |
| $SO_3$ | 2–4 | 3–4 | 2–4 | 2–4 | 2–4 | 2–4 | 2–4 | 2–4 | <0.3 |

TABLE 2

| | Unit | 1 | 2 | 3 | 4 | 5 | 6 | 7 | 8 | 9 | 10 | 11 | 12 | 13 | 14 | 15 | 16 |
| --- | --- | --- | --- | --- | --- | --- | --- | --- | --- | --- | --- | --- | --- | --- | --- | --- | --- |
| Oxide Mixture | | | | | | | | | | | | | | | | | |
| 1 | Wt. % | 30.1 | — | — | 30.1 | — | 27.7 | — | — | 25.0 | — | — | 27.0 | 27.0 | 22.0 | — | 29.0 |
| 2 | | — | 30.1 | — | — | 25.6 | — | 26.0 | — | — | 21.3 | — | — | — | — | — | — |
| 3 | | — | — | 30.1 | — | — | — | — | 25.3 | — | — | 22.2 | — | — | — | 22.2 | — |
| Curing Agent | | | | | | | | | | | | | | | | | |
| 1 | Wt. % | 30.1 | 30.1 | 30.1 | — | — | — | 26.0 | — | — | — | — | 27.0 | — | — | — | 23.0 |
| 2 | | — | — | — | 30.1 | 24.0 | — | — | — | 25.0 | — | — | — | 27.0 | — | 22.2 | — |
| 3 | | — | — | — | — | — | 27.1 | — | 25.3 | — | 21.3 | 22.2 | — | — | 22.0 | — | — |
| Filler | | | | | | | | | | | | | | | | | |
| Quartz Sand 0.1–0.25 mm | Wt. % | 33.7 | 33.7 | 33.7 | 33.7 | — | 41.7 | 26.0 | — | — | 31.9 | 33.3 | 40.5 | 43.25 | 21.0 | 26.6 | 46.0 |
| Corundum 0–0.5 mm | | — | | | | 41 | — | 13.0 | 38.0 | 38.0 | 10.6 | 11.1 | — | — | 16.0 | 22.2 | — |
| Accelerator | | | | | | | | | | | | | | | | | |
| Calcium oxide | | 6.1 | 6.1 | 6.1 | 6.1 | — | 3.5 | 2.45 | — | 2.5 | 4.25 | — | — | — | 2.2 | 2.2 | |
| Barium oxide | | — | — | — | — | 9.4 | — | — | 5.05 | — | — | — | — | — | 4.3 | — | |
| Magnesium oxide | | — | — | — | — | — | — | — | — | 2.25 | — | — | — | — | — | — | |
| Portland cement | | — | — | — | — | — | — | 3.25 | 3.8 | 3.6 | 8.5 | 6.6 | — | — | 6.6 | 6.6 | |
| Aluminous cement | | — | — | — | — | — | — | 3.25 | 2.5 | 3.6 | — | — | — | — | 4.3 | 6.6 | |
| Lithium carbonate | | — | — | — | — | — | — | 0.05 | 0.05 | 0.05 | — | — | — | — | — | 0.05 | |
| Calcium carbide | Wt. % | — | — | — | — | — | — | — | — | — | 2.15 | 4.6 | — | — | — | — | |
| Sodium amide | | — | — | — | — | — | — | — | — | — | — | — | — | — | 1.6 | — | |
| Sodium azide | | — | — | — | — | — | — | — | — | — | — | — | — | — | — | — | 2.0 |
| Sodium tetra-carbonyl-ferrate | | — | — | — | — | — | — | — | — | — | — | — | — | — | — | 1.35 | — |
| Aluminum hydride | | — | — | — | — | — | — | — | — | — | — | — | 5.5 | 2.75 | — | — | — |
| Additional Water | Wt. % | — | — | — | 2.4 | — | — | 2.6 | 2.5 | 3.0 | 3.2 | 4.5 | 1.7 | 1.0 | 5.5 | 4.5 | 1.4 |
| Pot Life | min. | 10 | 10 | 15 | 20 | 40 | 30 | 15 | 15 | 15 | 15 | 10 | 20 | 30 | 60 | 10 | 15 |
| Green strength after | min. | 30 | 25 | 40 | 35 | 60 | 60 | 45 | 45 | 40 | 30 | 30 | 60 | 90 | 240 | 30 | 60 |
| Bond strength after | min. | 180 | 150 | 210 | 200 | 240 | 360 | 240 | 240 | 210 | 240 | 180 | 300 | 360 | 1440 | 360 | 240 |
| Pull-out value/ M12 anchor rod | KN | 40 | 48 | 50 | 45 | 40 | 40 | 45 | 45 | 42 | 25 | 20 | 25 | 30 | 50 | 50 | 25 |

We claim:

1. A composition which cures and sets in the presence of water comprising
   a) a backbone polymer forming component selected from finely divided $SiO_2$ or a mixture of finely divided $SiO_2$ and $Al_2O_3$,
   b) a curing component selected from at least one member of the group consisting of
      at least partially water soluble alkali metal silicate, alkaline earth metal silicate, ammonium silicate, or
      a precursor of an alkali metal silicate or alkaline earth metal silicate, which is a combination of amorphous disperse powdery silicic acid and material selected from at least one member of the group selected from alkali metal oxide, alkali metal hydroxide, alkaline earth metal oxide, and alkaline earth metal hydroxide,
   c) a curing accelerator component selected from material which causes at least 500 joules/g of heat to be evolved upon dissolving in water and is selected from at least one member of the group consisting of an anhydrous oxide of Be, Mg, Ca, Sr and Ba, whereby the heat evolved when the composition is contacted with water accelerates the curing of the composition and
   d) optionally, filler and blowing agent, in which the ratio by weight of a): b): c: is between 80 to 20:5 to 60:0.1 to 25.

2. The composition of claim 1, in which the proportion of $SiO_2$ and $Al_2O_3$ in the mixture mixture thereof is within the range of 5% to 98% by weight of $SiO_2$ and 2% to 95% by weight of $Al_2O_3$.

3. The composition of claim 1, in which the proportion of $SiO_2$ and $Al_2O_3$ in the mixture thereof is within the range of 5% to 80% by weight of $SiO_2$ and 95% to 20% of $Al_2O_3$.

4. The composition of claim 1, in which the mixture of finely divided $SiO_2$ and $Al_2O_3$ is selected from at least one member of the group selected from dust from a high-temperature smelting process, filter dust, electrostatic filter ash from a high temperature power plant or calcined bauxite.

5. The composition of claim 1, in which at least a portion of the $SiO_2$ of component a) is insoluble $SiO_2$ from amorphous disperse powdery, water containing silicic acid.

6. The composition of claim 1, in which the alkali metal of component b) is selected from at least one member of the group consisting of ammonium, sodium and potassium and in which the molar ratio of silicon dioxide to alkali metal in the composition is 1 to 5:1.

7. The composition of claim 1, in which the alkali metal of component b) is selected from at least one member of the group consisting of ammonium, sodium and potassium and in which the molar ratio of silicon dioxide to alkali metal in the composition is 1.5 to 4:1.

8. The composition of claim 1, in which component b) is present in the form of said precursor of an alkali metal silicate or alkaline earth metal silicate.

9. The composition of claim 1, in which component b) is present in the form of a precursor of an alkali metal silicate which is a combination of a solid alkali metal hydroxide and amorphous disperse powdery water containing silicic acid.

10. The composition of claim 1, which contains at least one foam forming component.

11. The composition of claim 1, which contains at least one foam forming component which is comprised of at least one material which releases gas when the molding composition comes into contact with water.

12. A method for curing a composition, comprising forming an intimate mixture of components
   a) a backbone polymer forming component selected from finely divided $SiO_2$ or a mixture of finely divided $SiO_2$ and $Al_2O_3$,
   b) a curing component selected from at least one member of the group consisting of
      at least partially water soluble alkali metal silicate, alkaline earth metal silicate, ammonium silicate, or
      a precursor of an alkali metal silicate or alkaline earth metal silicate, which is a combination of amorphous disperse powdery silicic acid and material selected from at least one member of the group selected from alkali metal oxide, alkali metal hydroxide, alkaline earth metal oxide, and alkaline earth metal hydroxide,
   c) a curing accelerator component selected from material which causes at least 500 joules/g of heat to be evolved upon dissolving in water and is selected from at least one member of the group consisting of an anhydrous oxide of Be, Mg, Ca, Sr and Ba, whereby the heat evolved when the composition is contacted with water accelerates the curing of the composition and adding water to the intimate mixture to form a paste having a deformable consistency and allowing the paste to cure.

13. A method for curing a composition, comprising forming an intimate mixture of components
   a) a backbone polymer forming component selected from finely divided $SiO_2$ or a mixture of finely divided $SiO_2$ and $Al_2O_3$ and
   b) a curing component selected from at least one member of the group consisting of
      at least partially water soluble alkali metal silicate, alkaline earth metal silicate, ammonium silicate, or
      a precursor of an alkali metal silicate or alkaline earth metal silicate, which is a combination of amorphous disperse powdery silicic acid and material selected from at least one member of the group selected from alkali metal oxide, alkali metal hydroxide, alkaline earth metal oxide, and alkaline earth metal hydroxide, adding water to the intimate mixture to form a paste having a deformable consistency, adding component
   c) a curing accelerator component selected from material which causes at least 500 joules/g of heat to be evolved upon dissolving in water and is selected from at least one member of the group consisting of an anhydrous oxide of Be, Mg, Ca, Sr and Ba, whereby the heat evolved when the composition is contacted with water accelerates the curing of the composition to the paste and allowing the paste to cure.

14. A method for fastening anchoring means in boreholes comprising pouring an amount of a composition comprising
   a) a backbone polymer forming component selected from finely divided $SiO_2$ or a mixture of finely divided $SiO_2$ and $Al_2O_3$,
   b) a curing component selected from at least one member of the group consisting of
      at least partially water soluble alkali metal silicate, alkaline earth metal silicate, ammonium silicate, or
      a precursor of an alkali metal silicate or alkaline earth metal silicate, which is a combination of amorphous disperse powdery silicic acid and material selected from at least one member of the group selected from alkali metal oxide, alkali metal hydroxide, alkaline earth metal oxide, and alkaline earth metal hydroxide,
   c) a curing accelerator component selected from material which causes at least 500 joules/g of heat to be evolved upon dissolving in water and is selected from at least one member of the group consisting of an anhydrous oxide of Be, Mg, Ca, Sr and Ba, whereby the heat evolved when the composition is contacted with water accelerates the curing of the composition and
   d) optionally, filler and blowing agent, in which the ratio by weight of a):b):c: is between 80 to 20:5 to 60:0.1 to 25 in a borehole and pressing the anchoring means in the borehole so as to fasten the anchoring means.

* * * * *